April 28, 1953 — N. R. KRAUSE — 2,636,330
CORN PICKER REVERSING TRANSMISSION
Filed Dec. 20, 1948 — 2 SHEETS—SHEET 1
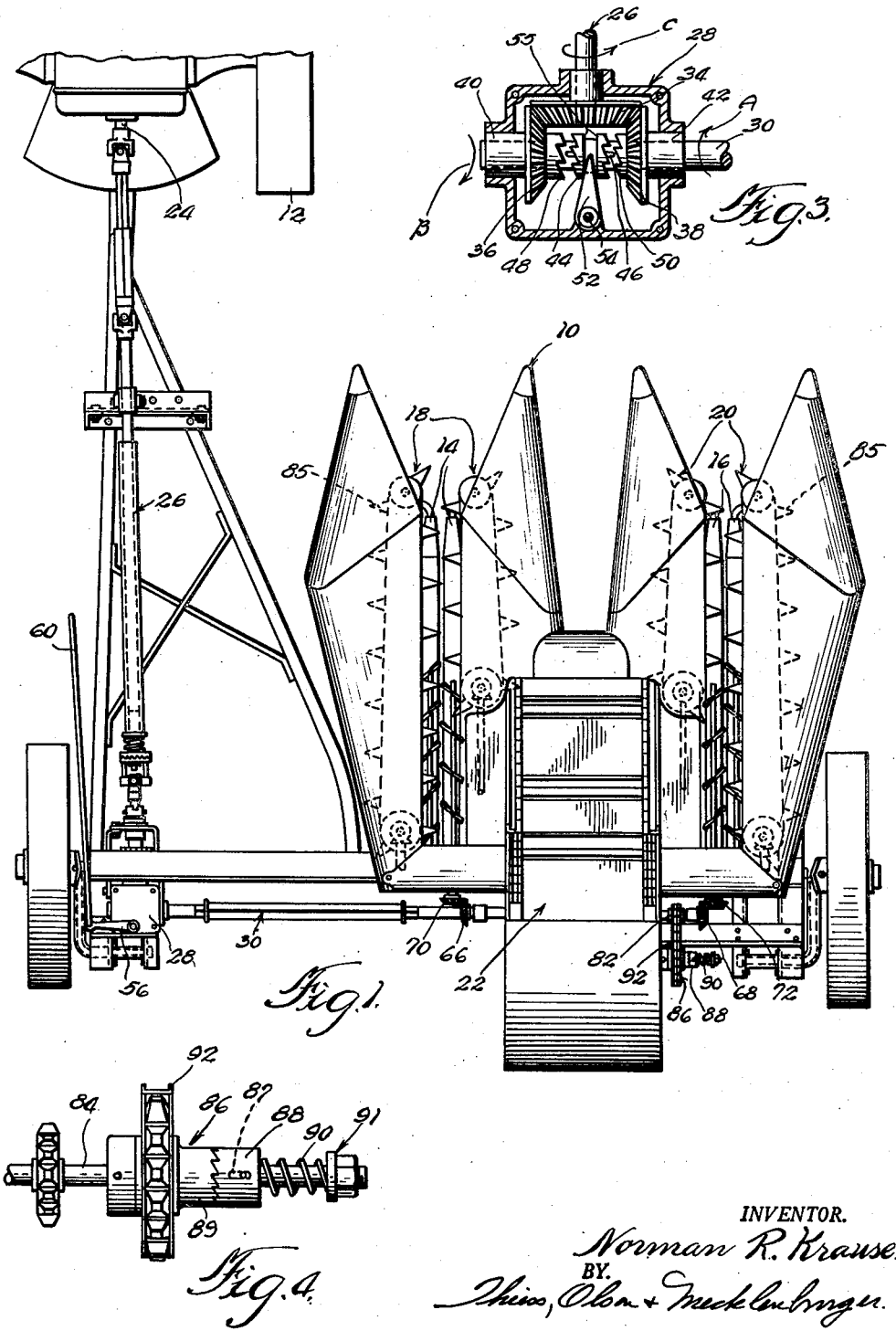
INVENTOR.
Norman R. Krause.

April 28, 1953   N. R. KRAUSE   2,636,330
CORN PICKER REVERSING TRANSMISSION
Filed Dec. 20, 1948   2 SHEETS—SHEET 2

INVENTOR.
Norman R. Krause.
BY
Thiess, Olson & Mecklenburger.
Attys.

Patented Apr. 28, 1953

2,636,330

UNITED STATES PATENT OFFICE 2,636,330

CORN PICKER REVERSING TRANSMISSION

Norman R. Krause, Racine, Wis., assignor to J. I. Case Company, Racine, Wis., a corporation of Wisconsin Application December 20, 1948, Serial No. 66,186

1 Claim. (Cl. 56—105)

This invention relates to corn harvesters and, more particularly, to improvements in corn pickers of the character disclosed in my prior Patent No. 1,922,375, dated August 15, 1933. Corn pickers of this general type are provided with one or more pairs of snapping rolls for separating ears from the stalks, an elevator associated with each pair of snapping rolls for conveying the separated ears to a desired point, and gathering means for directing the ears from each pair of snapping rolls to the corresponding elevator.

Frequently while operating a corn picker of this general type, the snapping rolls may become choked up due to the accumulation of weeds, crushed stalks, and other foreign materials therebetween. The usual practice under such circumstances has been for the operator to stop the corn picker and pry loose the foreign materials from between the rolls with some sharp instrument. This operation is often dangerous to the operator, damaging to the rolls, and causes considerable loss of time in the harvesting process. Thus it is one object of this invention to provide means for relieving this choked-up condition between the snapping rolls, which is safe to the operator and machine as well, and will produce the desired effect in a quick and effective manner.

A further object of this invention is to provide means for preventing the delivery of such foreign materials to the elevator after being removed from between the snapping rolls.

A still further object of this invention is the provision of means for effecting the above indicated desired results which may readily be controlled by the operator of the harvester.

Further and additional objects will appear from the following description, the accompanying drawings, and the appended claim.

In accordance with one embodiment of this invention a corn picker is provided having one or more pairs of substantially parallel snapping rolls between which the ear-bearing stalks pass as the picker progresses down a row of corn in a field, said snapping rolls normally rotating downwardly and inwardly toward each other, thus removing the ears from the stalks and holding the stalks upright while they pass between the rolls, said snapping rolls having associated therewith a reversible transmission operated by means of a suitable control lever whereby the relative direction of rotation of the snapping rolls may be reversed (i. e., upwardly and outwardly from each other), thus relieving any choked-up condition of the rolls in a safe, quick, and effective manner. Additional mechanism is provided so that, simultaneous with the reversal of the rotation of the snapping rolls, the movement of an elevator, which receives the snapped ears at the rear of the rolls, is stopped and remains in a stationary position until the rolls are once more put in normal operation by the operator. Thus by having the elevator stationary during the time the rolls are reversed in rotation, the snapped ears already in the elevator are kept free from the foreign materials ejected from between the rolls. Also the mechanism is arranged so that each gathering chain adjacent each pair of snapping rolls for directing the snapped ears rearwardly to the elevator in normal operation also reverses direction with the rolls, whereby the foreign materials ejected by the rolls is swept clear toward the forward end of the harvester.

For a more complete understanding of this invention, reference is now made to the drawings wherein Fig. 1 is a top plan view of a corn picker embodying this invention shown connected to the rear end of a tractor for drawing and operating the same.

Fig. 3 is an enlarged fragmentary top plan view of the reversing transmission for the snapping rolls and associated mechanism shown in Figs. 1 and 2 with a portion of the gear box housing removed.

Fig. 4 is an enlarged fragmentary top plan view of the one-way clutch mechanism for the elevator drive used with the picker shown in Figs. 1 and 2.

Figure 7:
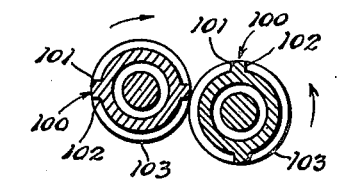
Fig. 7 is an enlarged sectional view of a pair of the snapping rolls taken along line 7—7 of Fig. 2.

Referring now to the drawings, a corn picker 10, adapted for being drawn and operated by a tractor 12, is provided with two pairs of substantially parallel snapping rolls 14 and 16 which are normally driven to rotate inwardly and downwardly in order to remove the ears from cornstalks as the picker progresses down two rows of corn and to hold erect the ear-bearing stalks while they progress rearwardly between the rolls. Two pairs of gathering chains 18 and 20 are provided and are driven to direct the snapped ears of corn rearwardly in normal operation to an elevator 22 located adjacent the rear of the said rolls 14 and 16 and chains 18 and 20 for receiving and conveying the snapped ears of corn to a desired point. The rolls 14 and 16, the gathering chains 18 and 20, and the elevator 22 are power driven. The power for driving these parts of the corn picker 10 is taken from a power take-off 24 of tractor 12 to a longitudinal drive shaft 26 of the corn picker 10, all as disclosed in my prior Patent No. 1,922,375. In accordance with the herein disclosed invention there is provided a reversing transmission gear box 28 operably associated with the drive shaft 26 and with a transverse drive shaft 30.

Figure 2:
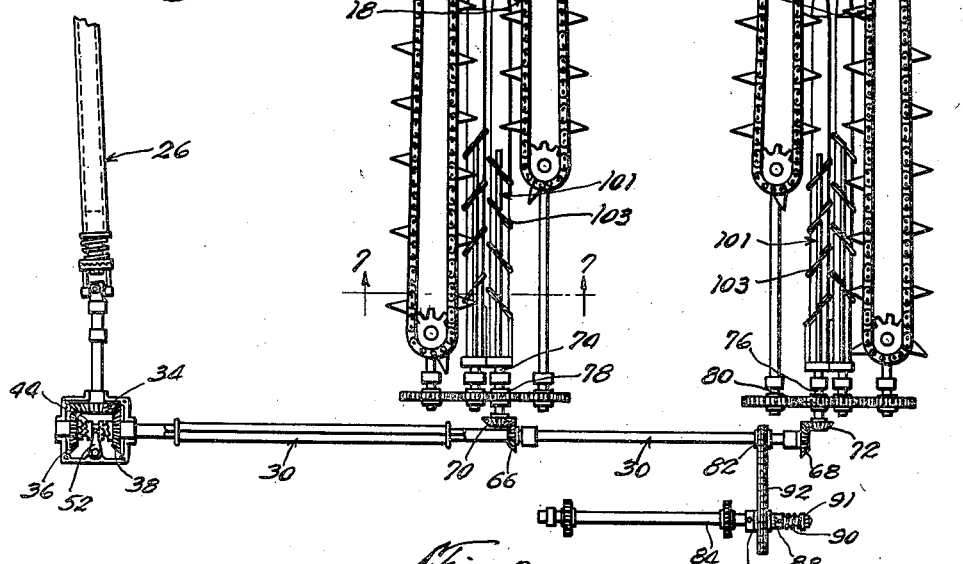
Fig. 2 is a diagrammatic view of the power transmitting mechanism utilized in the picker.
Figure 5:
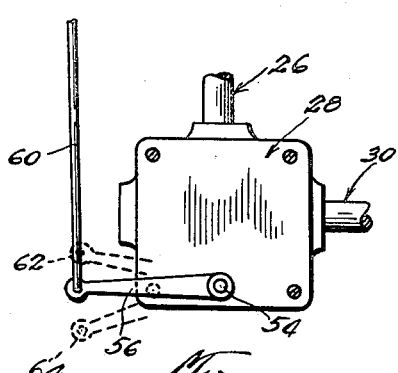
Fig. 5 is an enlarged fragmentary top plan view of the gear box shown in Fig. 3 with the top cover in place.
Figure 6:
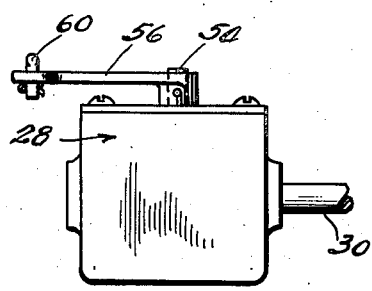
Fig. 6 is an enlarged fragmentary rear elevation of the gear box shown in Fig. 5.

As shown most clearly in Fig. 3, the shaft 26 terminates within the gear box housing 28 and has keyed to it a bevel gear 34. Said bevel gear 34 meshes with a pair of bevel gears 36 and 38, which latter are rotatably mounted within the gear box housing 28 by means of bearing sleeves 40 and 42. Within the gear box housing 28 is located a two-way clutch 44 which is keyed to the shaft 30 through a longitudinal slot 46 cut in shaft 30 whereby said clutch may be movable for a limited distance therealong. Said clutch 44 may be moved by means of an arm 52 in either direction so that the dog teeth thereon may alternately engage with dog teeth 48 and 50 of bevel gears 36 and 38 respectively. The arm 52 is pivoted at one end to the gear box housing 28 at point 54, and is bifurcated at its other end to engage with a peripheral groove 55 cut in the center of two-way clutch 44. Another arm 56 (see Figs. 5 and 6), which is in a fixed relative position to arm 52 forming a bell crank lever, is also attached at point 54 to the gear box 28. To the protruding end of arm 56 is connected control rod 60, which leads to the control cab (not shown) of the tractor 12. Thus the operator by means of control rod 60 may activate arm 56 to a forward position 62 or rearward position 64, as shown by the dotted lines in Fig. 5. This movement, in turn, activates the clutch 44 to engage the dog teeth 50 of the bevel gear 38 when said arm 56 is in forward position 62 (Fig. 5) and rotates shaft 30 in direction A (Fig. 3) or to engage the dog teeth 48 of bevel gear 36 when arm 56 is in rearward position 64 and rotates shaft 30 in direction B. The shaft 26 continues to rotate in the same direction C regardless of the position of clutch 44. Thus the rotation of shaft 30 may be reversed quickly and easily by the operator when required. The power for driving the snapping rolls 14 and 16 and the gathering chains 18 and 20 is taken off of drive shaft 30 through bevel gears 66 and 68 which are keyed to said shaft 30 and, in turn, mesh with bevel gears 70 and 72, which are keyed to the shafts 74 and 76 of the two inward snapping rolls, as shown in Fig. 2. To each of these shafts 74 and 76 are keyed spur gears 78 and 80 respectively which mesh with adjacent spur gears, which latter are attached to the shafts of the other adjacent snapping roll and to the adjacent drive shafts for the gathering chains. Thus there is a direct drive from shaft 30 to the snapping rolls 14 and 16 and to the gathering chains 18 and 20.

Thus both the snapping rolls and the gathering chains are reversed in rotational direction when the operating arm 60 is moved from position 62 to position 64, it being understood that the position indicated in the full lines of the drawings is a neutral position in which no power is transmitted to shaft 30. From a sprocket 82, which is keyed to shaft 30 as shown in Fig. 2, a drive shaft 84 for the elevator 22 is chain driven in the manner disclosed in my prior Patent No. 1,922,375. The elevator is arranged to operate during the normal operation of machine. However, in accordance with this invention it is not desired that the elevator mechanism be reversed when the transmission is actuated for reversal of the snapping rolls and gathering chains. Accordingly there is provided a sprocket 86 (see Figs. 2 and 4) rotatably mounted on the elevator drive shaft 84 and adapted for engaging a dog clutch 88 keyed to the drive shaft 84 through a slot 87 whereby limited axial movement of the clutch along the shaft is permitted. Said clutch 88 is caused to engage adjacent portion 89 of the sprocket 86 by means of a spring 90 compressed between the clutch 88 and a nut and washer assembly 91 threadably secured to one end of the shaft 84. Thus the rotation of drive shaft 30 in one direction is transmitted from sprocket 82 to sprocket 86 through chain 92, to clutch 88 which operates the elevator through the drive shaft 84. However, upon reversal of the transmission mechanism 28, the relative positioning of the dog teeth on clutch 88 and sprocket 86 and the normal load on the elevator causes the clutch 88 to move axially away from the sprocket 86, thereby disengaging the dog teeth. The clutch thereby becomes disengaged and no power is transmitted to the elevator for reverse movement thereof. Upon normal operation being re-established by the operator through the transmission, the spring 90 will move the clutch 88 along the shaft 84 toward the sprocket 88 whereby the clutch and sprocket are operatively engaged by means of the dog teeth thereon. As a result when the snapping rolls 14 and 16 and gathering chains 18 and 20 are reversed in rotation by the operator, the drive shaft 84 and elevator 22 remain stationary.

It will be noticed on reference to Figs. 1 and 2 that the gathering chains include fingers or "spuds" 85 which are shaped so as to operate in either direction without carrying broken stalks and chaff beyond the point of release, which is just before the spud is carried around the sprocket. In this instance the spud is triangular in shape so as to allow the stalks and chaff to slip from it easily. This is especially important when the gathering chains are traveling in the reverse direction, as when the choked material is being released from the roller to be deposited upon the ground forwardly. At this lower discharge point, the spuds pass rather close to the ground and must therefore be shaped as shown to strip properly when they pass around the sprockets.

Each pair of snapping rolls 14 and 16 is provided with a plurality (only two are shown in this instance) of longitudinally desposed ribs 100, which as shown in Figs. 1 and 2 extend at least half the length thereof and aid in performing the supporting operation. As shown in Fig. 7, the axes of rotation of the rolls are offset with respect to one another and the leading edges 101 of the ribs 100, when the rolls are rotating in their normal operating direction C, are rounded somewhat by their frequent contact with the stalks as they pass between the rolls. The trailing edges 102, on the other hand, remain sharp because they are substantially protected from contact with the stalks during normal operation of the rolls. Thus upon reversing the rotation of the rolls, the sharp edges 102 of the ribs 100 become the leading edges and readily grip or bite into the clogged material disposed therebetween and eject it therefrom. The longitudinally spaced spiral ribs 103 mounted on the rolls and the fingers 85 mounted on the chains 18 direct the ejected material forwardly along the rolls for discharge thereof at the front or forward end of said rolls.

From the foregoing description, it will be seen that a safe, quick and effective way has been provided for reversing the rotation of the snapping rolls 14 and 16 and gathering chains 18 and 20 when required for ridding said snapping rolls of foreign materials which may have accumulated between said rolls without reversing the direction of the elevator 22.

While a particular embodiment of this invention is shown above, it will be understood, of course, that the invention is not to be limited thereto, since many modifications may be made and it is contemplated, therefore, by the appended claim, to cover such modifications as fall within the true spirit and scope of this invention.

Having thus described the invention what is claimed and desired to be secured by Letters Patent is:

In a corn harvester a mobile frame having at least two pairs of longitudinally extending snapping rolls mounted thereon, a longitudinally extending power shaft on said frame and driven in one direction only from a suitable source of power, forward and reverse drive gears drivingly connected to said shaft, a transversely extending shaft operably connected to said gears and to said snapping rolls for driving the rolls in opposite directions and for reversing the direction of rotation of the rolls.

NORMAN R. KRAUSE.

References Cited in the file of this patent

UNITED STATES PATENTS

| Number | Name | Date |
|---|---|---|
| 841,704 | Moore | Jan. 22, 1907 |
| 1,008,942 | Boda | Nov. 14, 1911 |
| 1,922,375 | Krause | Aug. 15, 1933 |
| 2,152,273 | Otto | Mar. 28, 1939 |
| 2,366,408 | Jenson | Jan. 2, 1945 |
| 2,525,481 | Flora | Oct. 10, 1950 |